United States Patent [19]

Lucas

[11] Patent Number: 5,020,843
[45] Date of Patent: Jun. 4, 1991

[54] CRANE HOOK LATCH WITH SLIDING LOCK BAR

[76] Inventor: Charles E. Lucas, 2664 W. 71st St., Tulsa, Okla. 74132

[21] Appl. No.: 488,746

[22] Filed: Mar. 2, 1990

[51] Int. Cl.⁵ .............................................. B66C 1/36
[52] U.S. Cl. .............................. 294/82.21; 24/599.5; 24/600.2
[58] Field of Search ..................... 294/82.19–82.21; 24/599.1, 599.4–599.9, 600.2

[56] References Cited

U.S. PATENT DOCUMENTS

| | | |
|---|---|---|
| 1,879,167 | 9/1932 | Freysinger ........................ 24/599.5 |
| 1,985,596 | 12/1934 | Burnham ........................... 294/82.2 |
| 3,317,972 | 5/1967 | Harley ............................... 24/599.4 |
| 3,575,458 | 4/1971 | Crook et al. ...................... 294/82.2 |
| 4,948,190 | 8/1990 | Lucas ................................ 294/82.2 |

Primary Examiner—Johnny D. Cherry

[57] ABSTRACT

A gate latch mounted on a hook shank and spanning the mouth of the hook from its shank to its tip includes a sliding lock bar which can be selectively linearly positioned in closed condition retention slots to prevent opening of the gate latch or in open condition retention slots to permit rotation of the gate latch from a closed to an open condition.

11 Claims, 3 Drawing Sheets

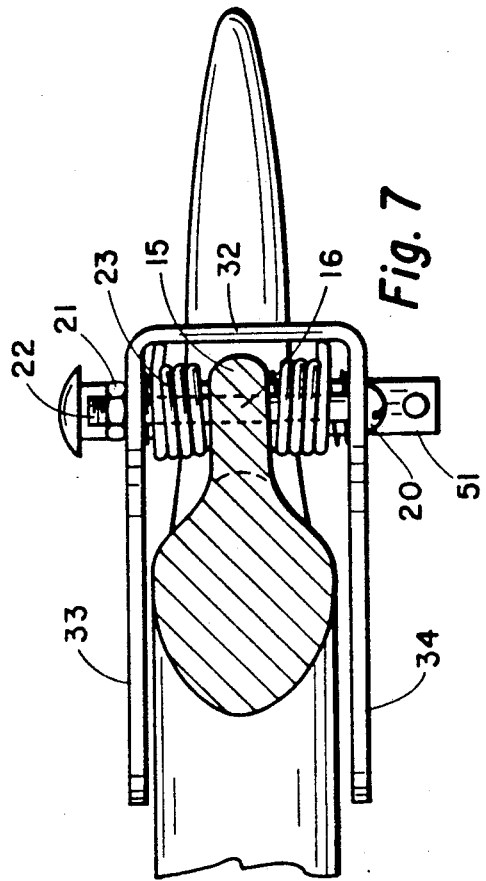
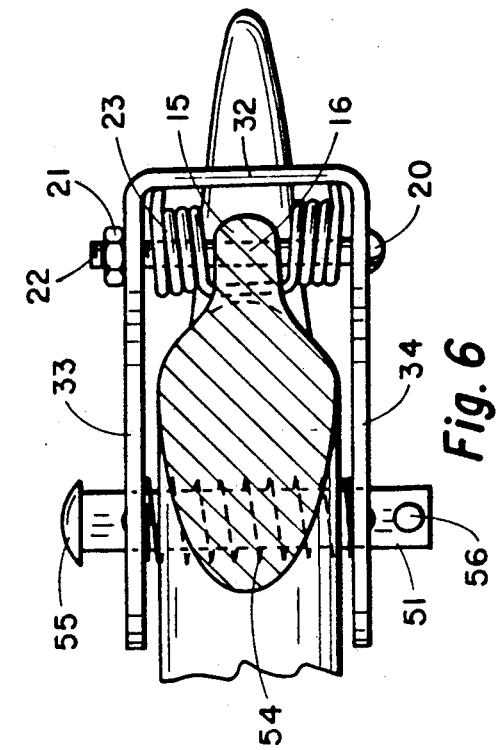
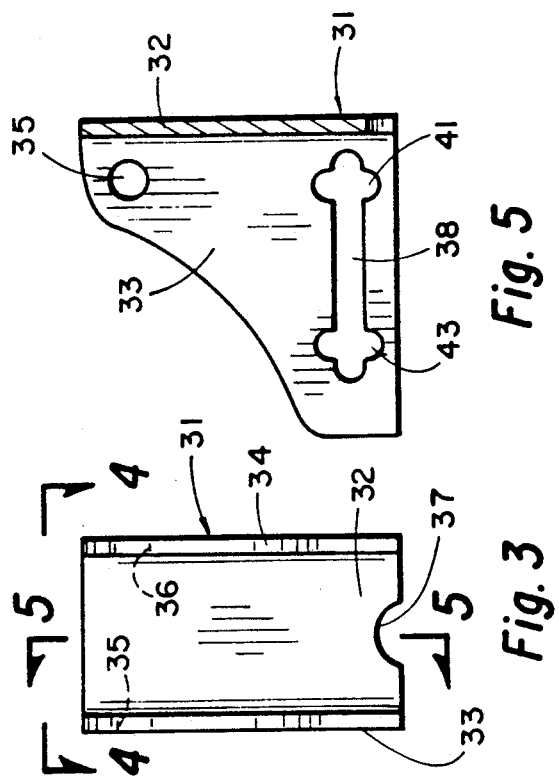
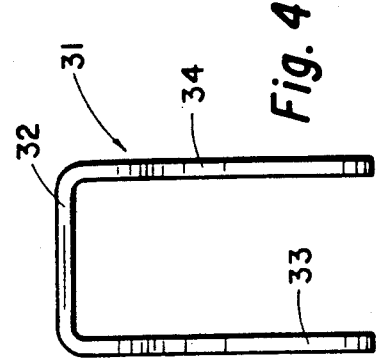

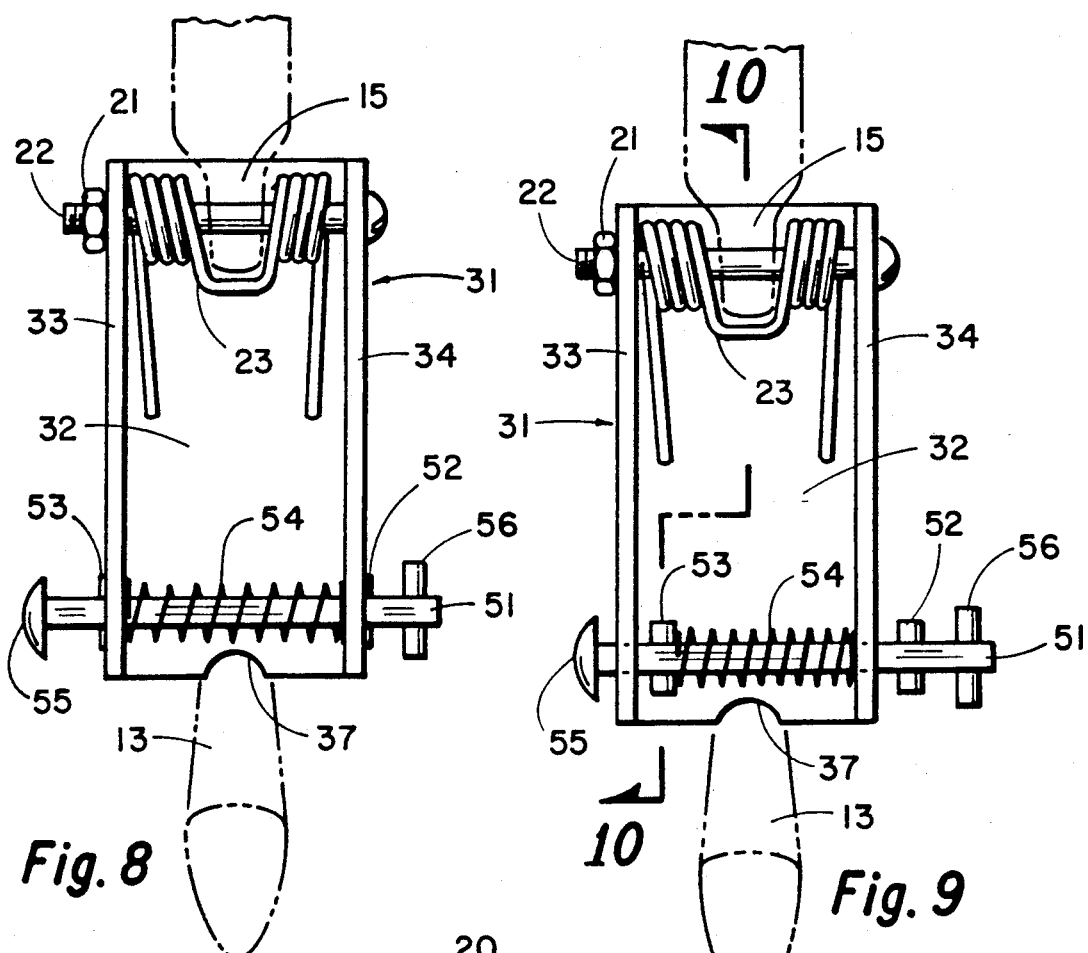
Fig. 8
Fig. 9
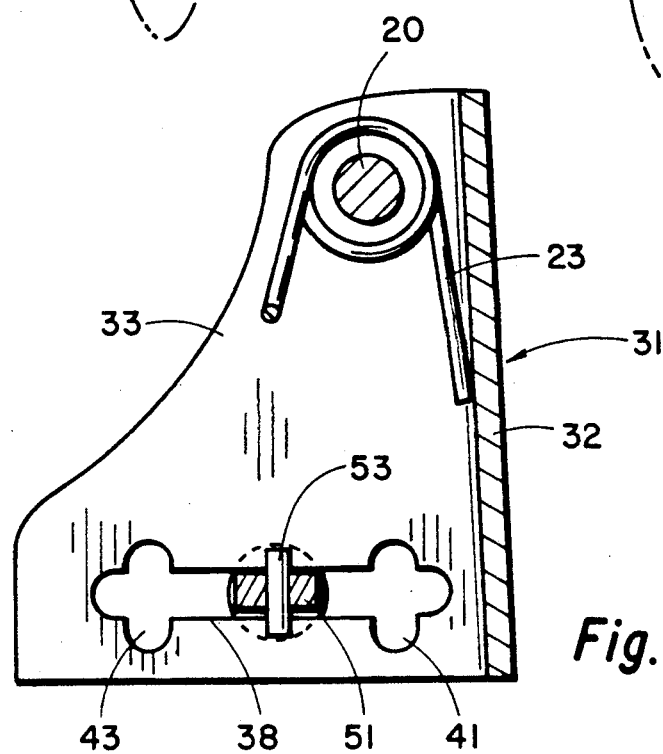
Fig. 10

CRANE HOOK LATCH WITH SLIDING LOCK BAR

BACKGROUND OF THE INVENTION

This invention relates generally to gate latches used for closing the mouths of crane hooks and more particularly concerns gate latches which are fixed in position by linear displacement of a sliding lock bar.

Crane type hoist hooks which include gate latches for closing the mouths of the hoist hooks are well known. In some structures dog pins have been used in combination with the latches to hold the gate latches in their closed positions across the mouths of the hooks. U.S. Pat. No. 2,927,358 is an example of a hoist hook having this type of latching mechanism. Other structures use an interlock member that is pivotally mounted on the latch and movable to a first position locking the latch closed, i.e. preventing opening of the latch and to a second open position allowing the latch to be pivoted to an open position. U.S. Pat. No. 3,575,458 is an example of a hoist hook having this type of latching mechanism.

SUMMARY OF THE INVENTION

In accordance with the invention a gate latch for closing the mouth of a hook is provided wherein a sliding lock bar can be selectively, linearly positioned in either closed-condition retention slots to prevent opening of the gate latch or open-condition retention slots to permit rotation of the gate latch from a closed to an open condition.

BRIEF DESCRIPTION OF THE DRAWINGS

Other objects and advantages of the invention will become apparent upon reading the following detailed description and upon reference to the drawings in which:

FIG. 3 is a rear elevational view of the latch housing;

FIG. 4 is a top plan view taken along the line 4—4 of FIG. 3;

FIG. 5 is a sectional view taken along the line 5—5 of FIG. 3;

FIG. 6 is a top plan view of the latch taken along line 6—6 of FIG. 1;

FIG. 7 is a top plan view taken along the line 7—7 of FIG. 2;

FIG. 8 is a rear elevational view taken along the line 8—8 of FIG. 1 with the hook shown in phantom for clarity;

FIG. 9 is a rear elevational view of the assembled latch of this invention depicting the movement of the lock bar as it is displaced from the open condition to the closed condition for preventing the movement of the latch; and FIG. 10 is a sectional view taken along the line 10—10 of FIG. 9.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways commensurate with the claims herein. Also it is to be understood that the phraseology or terminology employed herein is for the purpose of description and not of limitation.

Figure 1:
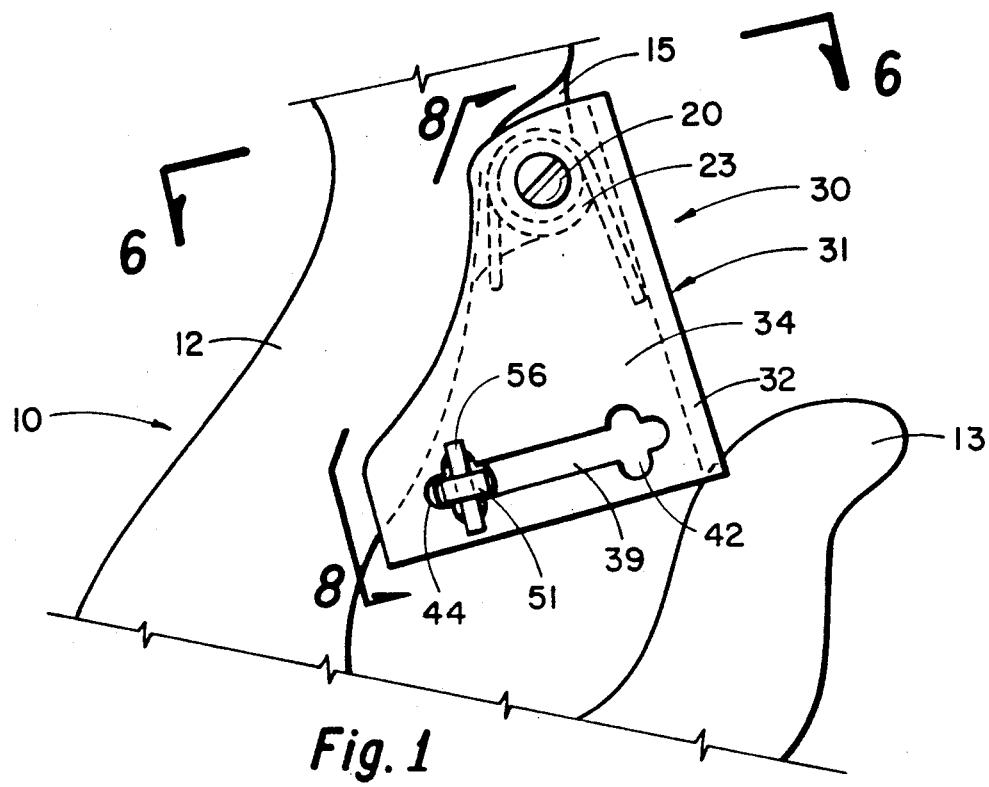
FIG. 1 is a side elevational view showing a hook partially and a latch incorporating the embodiments of this invention in the closed position.
Figure 2:
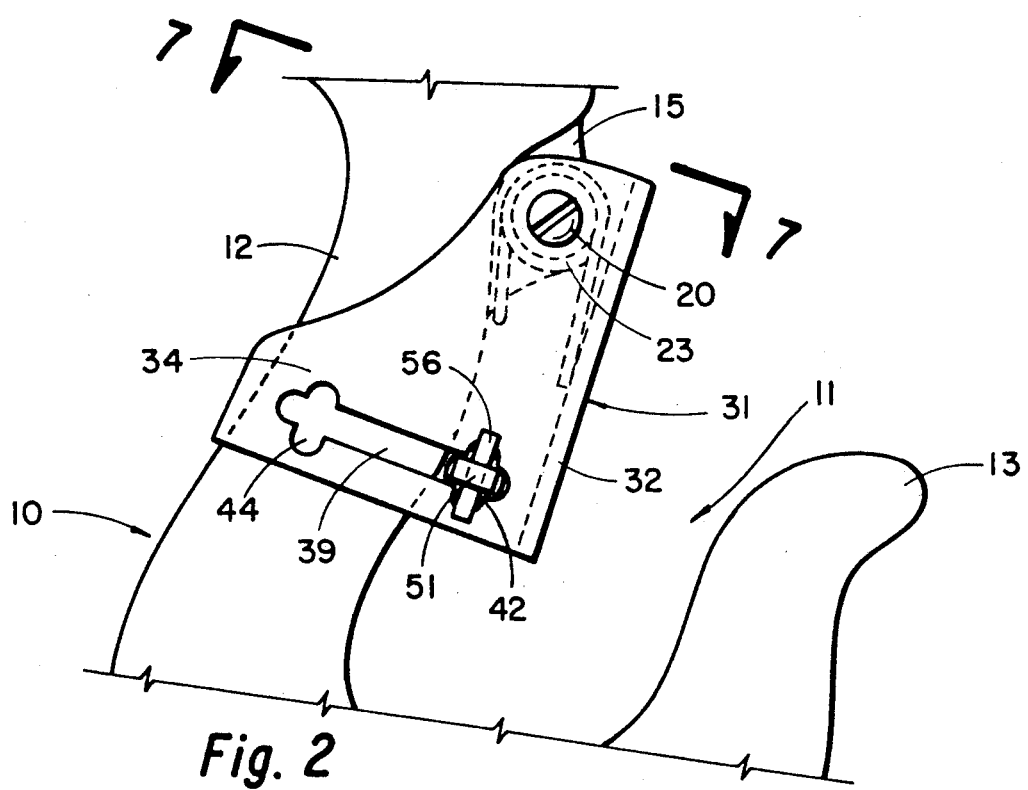
FIG. 2 is a side elevational view showing a portion of a hook and the latch in the open position.

Referring to the drawings, there is shown in FIGS. 1 and 2 a crane hook 10 in an assembled relationship with a gate latch 30 in a position closing the mouth 11 between the shank 12 and the outwardly turned tip 13 of the hook 10, the remaining portion of the generally C-shaped body forming the eye of the hook 10 not being shown. For that description, see for example, U.S. Pat. No. 3,575,458. The end of the hook 10 connecting with the curved shank 12 may include a ring or swivel, not shown, or any other form of connecting mechanism known to those skilled in the art. The gate latch 30 is pivotally attached to a projection 15 on the upper interior surface of the shank 12 by a pivot pin 20.

Looking at FIGS. 3, 4 and 5, the latch 30 is comprised of a generally U-shaped housing 31 having a flat outwardly facing base portion 32 and substantially triangular shaped parallel side walls 33 and 34. The base portion 32 and the side walls 33 and 34 can be formed from a single flat blank bent into the generally U-shaped configuration or cast or fabricated into the U-shape in a manner well known to those skilled in the art. Apertures 35 and 36 are provided in the apices of the triangular side walls 33 and 34. An aperture 16 is also provided through the projection 15 transverse to the mouth 11. With the projection 15 between the side walls 33 and 34, the apertures 16, 35 and 36 can be axially aligned to receive the pivot pin 20. The pivot pin 20 can consist of a nut 21 and a bolt 22. Coiled around the pivot pin 20 between the side walls 33 and 34 and the projection 15 are one or more torsion coil springs 23 which continuously bias the gate latch 20 toward a position in which the base portion 32 spans the mouth 11 from the projection 15 to the underside of the tip 13. The notch 37 is contoured to receive the underside of the tip 13 when the latch is fully closed. As shown in FIGS. 1 and 2 the pivot pin 20 and the torsion spring 23 are located within the U-shaped housing 31, thus protecting these parts from damage and foreign material. Linear guide slots 38 and 39 extend opposite each other in respective side walls 33 and 34, preferably proximate and substantially parallel to the edges of the side walls 33 and 34 opposite the apertures 35 and 36. The guide slots 38 and 39 include open condition retention slots 41 and 42 proximate their tip end and closed-condition retention slots 43 and 44 proximate their shank end. The retention slots are oppositely faced and are transverse to the guide slots 38 and 39.

Referring now to FIGS. 6 through 10, the locking assembly of the latch 30 is illustrated. The locking assembly includes a lock bar 51 of rectangular cross section which extends through the guide slots 38 and 39 in transverse relationship to the mouth 11 and the shank 12. The lock bar 51 may be manually slid in the guide slots 38 and 39 in this transverse position. A pair of lock pins 52 and 53 which extend through the lock bar 51 are spaced apart so that the pins 52 and 53 can be selectively aligned in the open-condition retention slots 41 and 42 or the closed-condition retention slots 43 and 44. A spring 54, coiled around the lock bar 51 between the pins 52 and 53, is disposed between the side walls 33 and 34. With the spring 54 compressed in this condition, each of the pins 52 and 53 is biased toward its respective opposite side wall 33 and 34 so that the lock pins 52 and 53 normally tend to alignment within the retention slots. The lock bar 51 may also be adapted to insure that neither of its ends can slide through the slots to a position between the side walls 33 and 34. This can be accomplished, for example, by use of a head 55 and roll pin 56 at opposite ends of the lock bar 51.

In operation, with the latch 30 pivotally mounted on the hook shank projection 15, the coiled spring 23 biases the notched end of the base portion 32 of the housing 31 into contact with the underside of the hook tip 13. In this condition, the base portion 32 of the housing 31 spans the mouth 11 of the hook 10 from the hook shank projection 15 to the underside of the hook tip 13, closing the mouth 11. If the lock pins 52 and 53 are aligned within the open-condition retention slots 41 and 42, the latch 10 is free to be rotated about the pivot pin 20 to open the mouth 11 of the hook 10. If it is desired to lock the latch 10 in closed condition, the lock bar 51 is manually pressed in either direction along its longitudinal axis against the bias of the spring 54 to disengage the lock pins 52 and 53 from the open condition retention slots. The spring 54 is thus further compressed between one of the lock pins 52 or 53 and its opposite side wall 34 or 33. The lock bar 51 is then manually slid in its transverse position in the guide slots 38 and 39 toward the hook shank until the lock pins 52 and 53 are aligned with the closed-condition retention slots 43 and 44. In this position, the lock bar 51 is released to bias, allowing the lock pins 52 and 53 to engage within the closed- condition retention slots 43 and 44. When so engaged, the lock bar 51 is proximate the interior surface of the hook shank 12 as to prevent rotation of the latch 10 into the open condition. To permit the latch 10 to be again rotated to the open condition, the procedure is the same except that the lock bar 51 is moved from the closed condition retention slots to the open condition retention slots.

Thus, it is apparent that there has been provided, in accordance with the invention, a crane hook latch that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use with a hook having a shank and a tip defining a mouth therebetween, the shank having a projection on its upper interior surface with an aperture transverse to said mouth therethrough, a gate latch for closing the mouth of the hook comprising:

a U-shaped housing having a base portion adapted to span said mouth from said projection to the underside of said tip and parallel side walls adapted to receive said shank therebetween during rotation of said latch into an open condition, each of said side walls having an aperture axially alignable with said projection aperture therebetween for pivotal engagement of said latch to said projection, said base portion having a notch in its tip end contoured to receive the underside of said tip therein when said latch is in a closed condition, said side walls having oppositely disposed linear guide slots adapted to extend, when said latch is in said closed condition, from a point proximate the interior lower surface of said shank toward the tip end of said base portion, said linear guide slots having oppositely disposed closed-condition retention slots transverse thereto and proximate the shank end thereof and oppositely disposed open condition retention slots transverse thereto and proximate the tip end thereof;

means cooperable with said apertures for pivotally engaging said housing to said projection;

means for biasing the notched end of said base portion toward said tip;

a locking assembly having a lock bar adapted to extend through said guide slots in transverse relationship to said shank and manually slide along the length of said guide slots and a pair of lock pins disposed through said bar and spaced for alignment within said retention slots; and means for biasing said lock pins into alignment with said retention slots whereby, when said lock pins are disposed in said open condition retention slots, said latch may be pivoted to open said mouth and, when said lock pins are disposed in said closed condition retention slots, said latch may not be pivoted to open said mouth.

2. A gate latch according to claim 1, said means for biasing said lock pins comprising a spring coiled around said lock bar and compressed between said side walls and their respectively opposite lock pins.

3. A gate latch according to claim 2 further comprising means for preventing the ends of said lock bar from sliding transversely to a position between said side walls.

4. A gate latch according to claim 3, said side walls being substantially triangular and said side wall apertures being disposed at apices thereof.

5. A gate latch according to claim 4, said guide slots being proximate and substantially aligned with the edges of said side walls opposite said apices.

6. A gate latch according to claim 5, said guide slots being perpendicular to said base portion.

7. A gate latch according to claim 6, said bar being of rectangular cross section.

8. A gate latch according to claim 7, said pivot means comprising a roll pin disposed through said side wall and projection apertures.

9. A gate latch according to claim 8, said pivot means further comprising means for preventing the ends of said roll pin from sliding transversely to a position between said side walls.

10. A gate latch according to claim 9, said means for biasing the notched end of said base portion toward said tip comprising one or more torsion springs coiled around said roll pin between said side walls and said projection and adapted to be compressed between said shank and said base portion of said latch.

11. For use with a hook having a shank and a tip defining a mouth therebetween, the shank having a projection on its upper interior surface with an aperture transverse to said mouth therethrough, a gate latch for closing the mouth of the hook comprising:

a U-shaped housing having a base portion adapted to span said mouth from said projection to the underside of said tip and parallel side walls adapted to receive said shank therebetween during rotation of said latch into an open condition, each of said side walls having an aperture axially alignable with said projection aperture therebetween for pivotal engagement of said latch to said projection, said side walls having oppositely disposed linear guide slots adapted to extend, when said latch is in a closed condition, from a point proximate the interior lower surface of said shank toward the tip end of said base portion;

means cooperable with said apertures for pivotally engaging said housing to said projection;

means for biasing the free end of said base portion toward said tip;

means disposed in said guide slots manually slidable in transverse relationship to said shank; and means for selectively locking said slidable means in position at either the shank end or the tip end of said guide slots whereby, when said slidable means is looked at the tip end, said latch maY be pivoted to open said mouth and, when said slidable means is locked at the shank end, said latch may not be pivoted to open said mouth.

* * * * *

UNITED STATES PATENT AND TRADEMARK OFFICE
CERTIFICATE OF CORRECTION

PATENT NO. : 5,020,843
DATED : June 4, 1991
INVENTOR(S) : Charles E. Lucas

It is certified that error appears in the above—identified patent and that said Letters Patent is hereby corrected as shown below:

Title page, item [73] should be added as followed:

Assignee: The Crosby Group, Inc., Tulsa, Oklahoma

Signed and Sealed this

First Day of March, 1994

Attest:

BRUCE LEHMAN

Attesting Officer

Commissioner of Patents and Trademarks